United States Patent [19]

Galli

[11] Patent Number: 4,600,591

[45] Date of Patent: Jul. 15, 1986

[54] DEVICE FOR THE PRODUCTION OF ICE-CREAM CONES AND THE PRODUCT OBTAINED

[76] Inventor: Carlo Galli, Via Capua 74, Roma, Italy

[21] Appl. No.: 674,829

[22] Filed: Nov. 26, 1984

[51] Int. Cl.[4] .............................................. A21C 15/02
[52] U.S. Cl. ..................................... 426/94; 426/138; 426/139; 426/282; 426/283
[58] Field of Search ............... 426/138, 139, 143, 282, 426/283, 94, 95

[56] References Cited

U.S. PATENT DOCUMENTS

| | | | |
|---|---|---|---|
| 1,607,664 | 11/1926 | Carpenter | 426/139 |
| 1,690,984 | 11/1928 | Lane et al. | 426/139 |
| 1,875,960 | 9/1932 | Turnbull | 426/139 |
| 1,876,105 | 9/1932 | Turnbull | 426/139 |
| 4,188,768 | 2/1980 | Getman | 426/306 |

FOREIGN PATENT DOCUMENTS 239017  10/1962  Australia ............... 426/139

*Primary Examiner*—Jeanette Hunter
*Attorney, Agent, or Firm*—Staas & Halsey

[57] ABSTRACT

A device operatively connected to a machine for the production of cone-shaped wafers and comprising: (1) a chain or belt conveyer for moving cone-shaped receptacles, which can be of an insert type; (2) a cream batcher and a presser for the wafers. The product obtained is an ice-cream cone constituted of a pair of equally tapered cone-shaped wafers and of a layer of cream interposed between the two wafers, one being fitted into the other.

4 Claims, 5 Drawing Figures

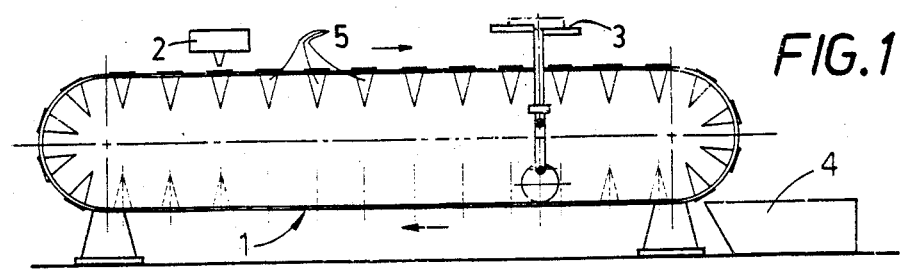
FIG.1
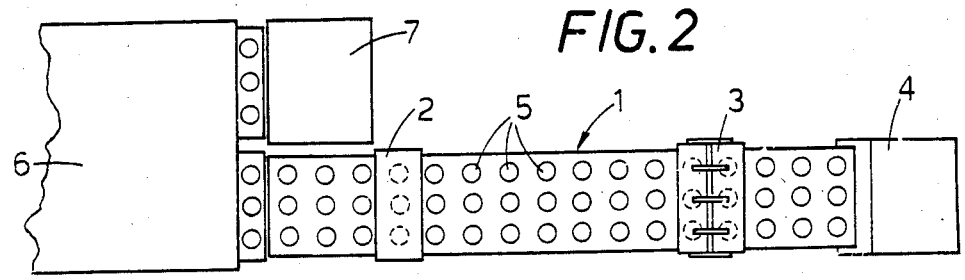
FIG.2
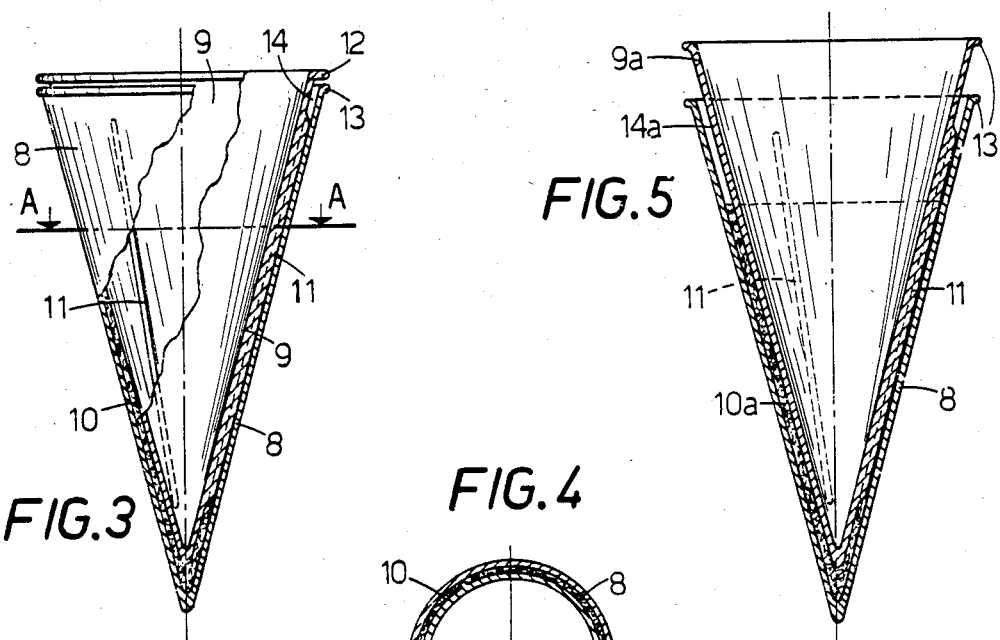
FIG.3
FIG.5
FIG.4

DEVICE FOR THE PRODUCTION OF ICE-CREAM CONES AND THE PRODUCT OBTAINED

FIELD OF THE INVENTION

The present invention relates to a device for the production of ice-cream cones and the product obtained.

BACKGROUND OF THE INVENTION

It is known that the usual ice-cream cone is a cone-shaped wafer produced by machines which form and cook measured quantities of a paste generally composed of water, flour and sugar. When the cone-shaped wafers leave the machine, they are ready for packaging.

It is noted that the ice-cream cones do not have only the function of being containers for the ice-cream, but also provide an alternative sensation to the cold substance, which, introduced continuously into the mouth, greatly reduces the sensibility of the palate and therefore diminishes the possibility of enjoying the diverse tastes of the ice-cream.

Accordingly, the wafer, due to its consistency and shape, has a particular importance, above all for ice-cream which is to be licked. In such a case, the wafer has also the function of a container, and this function will be as valid as is the wafer's ability to prevent the dripping of the ice-cream, which melts and runs down the borders of the cone.

SUMMARY OF THE INVENTION

With the present invention, the inventor wants to provide a tasteful, or more tasteful, ice-cream-containing element which also impedes, as much as possible, the dripping.

The process involves the combining of two, equally tapered cone-shaped wafers in such a way that one wafer can be coaxially fitted into the other, leaving between the two wafers a hollow space which can be filled with chocolate- or vanilla-flavoured cream or other creamy products.

Because it is necessary that the cone-shaped wafers, one having been fitted into the other, form between them a hollow space which has a radially constant dimension in correspondence with all possible cross-sections of the cone, there are provided at least three projections which are directed along the generatrix of the cone and which have the function of permitting the coaxial alignment of the two cone-shaped wafers and of creating a hollow space of the desired constant dimension, dependent upon the height of the projections.

For the production of the ice-cream cone described above, there is provided a device operatively connected to a machine for the production of cone-shaped wafers and comprising a conveyor for the external cone-shaped wafers, a cream batcher and a presser for the internal cone-shaped

BRIEF DESCRIPTION OF THE DRAWINGS

The characteristics of the present invention will be more evident from the following description taken in connection with the attached drawings, in which:

FIG. 1 is a diagrammatic side view of a device for the production of ice-cream cones according to the present invention;

FIG. 2 is a top plan view illustrating schematically the device of FIG. 1, which is connected to a machine for the production of cone-shaped wafers;

FIG. 3 is a side view, partially in longitudinal axial section, of an ice-cream cone according to a first embodiment of the invention;

FIG. 4 is a cross-section taken along the line A—A of FIG. 3; and

FIG. 5 is a longitudinal section of an ice-cream cone according to a second embodiment of the invention.

DETAILED DESCRIPTION OF PREFERRED EMBODIMENTS

With reference, first of all, to FIGS. 1 and 2, a chain or belt conveyor is designated by numeral reference 1; numeral 2 indicates a cream batcher; 3 indicates a presser for cone-shaped wafers; a container, which receives the finished product, is indicated as 4. Receptacles 5, tapered in the same dimension as the cone-shaped wafers, are inserted in the conveying means, i.e. belt or chain of the conveyor 1. The cone shaped receptacles 5, made, for example, of stainless steel, are aligned in three rows, as shown in FIG. 2; they advance longitudinally together with the conveyer belt or chain in the direction indicated by the arrows. On the left-hand side of FIG. 1, the wafers are fitted automatically, or by an operator, and they pass under the nozzles of the cream batcher 2, which dispense the desired quantity of cream, in the interval between the cream batcher 2 and the wafer presser 3, a second, empty wafer, i.e. the internal one, provided with projections on its external surface, is fitted into the wafer containing the cream.

The wafer presser 3 is an eccentric mechanism, which is connected to and moved by the conveyer 1 through suitable means. The wafer presser is provided with at least two pushing bars, which are fixed at different heights on the presser head in the direction of the movement of the belt. Therefore, the wafer presser 3 is able to gradually lower, by means of the contact surfaces of the pushing bars, two in number in FIGS. 1 and 2, two transversal rows of cone-shaped wafers. Immediately after, the wafers can be removed from the receptacles or can simply be allowed to fall into the collecting container 4.

In FIG. 2, the device described above is operatively connected to a machine 6 which produces the cone-shaped wafers.

For the purposes which will be explained hereinafter, it is useful that the machine 6 produces cone-shaped wafers of two different sizes, that is to say having slightly diverse conical bases, but mantaining the same taper. At the exit from the machine 6, "external" wafers, having a slightly larger dimension and designed to be fed into the conveyer, and smaller, internal wafers, collected in a container 7 and designed to be fitted by the operator into the external wafers at the same time.

In FIGS. 3 to 5, external wafers are indicated as 8, internal wafers as 9, 9a, and the cream layer interposed between the wafers 8 and 9, or 9a, is designated by numeral 10 or 10a. The wafers 8, 9 and 9a are conical and have the same taper.

The internal wafer 9 has on its external surface at least three projections 11 which are directed along the generatrix of the cone.

In the first embodiment (FIGS. 3 and 4), the internal wafers 9 has at its base, which has an area less than that of the external wafer 8, a circumferential edge 12 which protrudes radially and outwardly. Therefore, when the wafer 9 is fully fitted into the wafer 8, the circumferential edge 12 rests on the rim 13 of the wafer 8. The straight projections 11 insure that a constant space 14, designed to be filled with cream up to a set level, is maintained between the two cone-shaped wafers.

In the second embodiment (FIG. 5), the cone-shaped wafers 8, 9a have preferably the same base edges 13, and can have also the same dimensions. The cream filling 10a, which reaches up to a level less than that of the first embodiment, leaves a hollow space 14a, and the straight projections 11 allow the internal wafer 9a to remain raised in relation to the external wafer 8.

The first embodiment is provided in order to obtain a product having a more various and composite taste than that of the conventional product, while the second embodiment, because the wafer bases have different levels of elevation, and because the cream reaches a level lower than the first embodiment, is provided in order to favour retention of ice-cream eventually dripping from the edge of the internal wafer.

What is claimed is:

1. A device for combining inner and outer wafer conical shells such that they are spaced apart from each other and include therebetween a cream layer to form an edible composite pastry cone, said device to be mounted downstream of a machine for producing the inner and outer wafer conical shells, comprising:
   (a) a continuous, step-by-step, conveyor means including a plurality of transverse rows of conical receptacles for receiving the outer wafer conical shells produced by the machine upstream;
   (b) first feeding means positioned adjacent said conveyor means for inserting each outer wafer conical shell into each conical receptacle;
   (c) batching means for dispensing edible cream into each outer wafer conical shell located in a conical receptacle, as each row of conical receptacles passes below said batching means;
   (d) second feeding means for inserting each inner conical shell produced by the machine upstream coaxially into each outer wafer conical shell;
   (e) a vertically reciprocating presser means for pressing each inner wafer conical shell into the respective outer wafer conical shell containing the cream, so as to push the inner wafer conical shell coaxially into the respective outer wafer conical shell, and
   (f) means for collecting the formed edible composite pastry.

2. An edible composite pastry cone, comprising:
   (a) spaced, inner and outer, coaxial, equally tapered, wafer conical shells; and
   (b) a cream layer interposed to a predetermined height between the inner and outer wafer conical shells,
   wherein each inner wafer conical shell has on its external surface at least three projections along a generatrix of the conical surface thereof which define the thickness of the space formed between the inner and outer wafer conical shells receiving the cream and maintain coaxiality of the inner and outer wafer conical shells.

3. The cone as recited in claim 2, wherein the area of the inner wafer conical shell is less than the area of the outer wafer conical shell and the inner wafer conical shell is provided with a radial flange which partially covers a peripheral rim formed on the outer wafer conical shell, when said flange is brought into contact with the rim of the outer wafer conical shell during coaxial arrangement of the inner and outer wafer conical shells with the cream layer therebetween.

4. The cone is recited in claim 2, wherein the inner and outer wafer conical shells have the same area and shape, the inner wafer conical shell being provided with a radial flange which is spaced from a peripheral rim formed on the outer wafer conical shell, when the inner and outer wafer conical shells are arranged coaxially with the cream layer therebetween.

* * * * *

UNITED STATES PATENT AND TRADEMARK OFFICE
CERTIFICATE OF CORRECTION

PATENT NO. :   4,600,591

DATED    :   Jul. 15, 1986

INVENTOR(S) :   GALLI

It is certified that error appears in the above-identified patent and that said Letters Patent is hereby corrected as shown below:

FRONT PAGE [57] ABSTRACT

Line 5, "and a" should be --and; (3) a--.

Col. 1

Line 57, after "cone-shaped" insert --wafers.--.

Signed and Sealed this

Twenty-first Day of October, 1986

[SEAL]

Attest:

DONALD J. QUIGG

Attesting Officer

Commissioner of Patents and Trademarks